US012138689B2

(12) United States Patent
Geisen et al.

(10) Patent No.: US 12,138,689 B2
(45) Date of Patent: Nov. 12, 2024

(54) IRRADIATING METHOD FOR ADDITIVE PRODUCTION HAVING A PREDETERMINED TRAJECTORY

(71) Applicant: Siemens Energy Global GmbH & Co. KG, Bayern (DE)

(72) Inventors: Ole Geisen, Berlin (DE); Omar Fergani, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 876 days.

(21) Appl. No.: 17/263,993

(22) PCT Filed: Jul. 29, 2019

(86) PCT No.: PCT/EP2019/070327
§ 371 (c)(1),
(2) Date: Jan. 28, 2021

(87) PCT Pub. No.: WO2020/030461
PCT Pub. Date: Feb. 13, 2020

(65) Prior Publication Data
US 2021/0299752 A1    Sep. 30, 2021

(30) Foreign Application Priority Data

Aug. 7, 2018   (EP) .................................. 18187680

(51) Int. Cl.
*B33Y 10/00* (2015.01)
*B22F 10/28* (2021.01)
(Continued)

(52) U.S. Cl.
CPC .............. *B22F 12/41* (2021.01); *B22F 10/28* (2021.01); *B22F 10/366* (2021.01); *B22F 10/38* (2021.01);
(Continued)

(58) Field of Classification Search
CPC .. F01D 5/005; B23P 6/007; B23P 6/04; B23P 6/045; B33Y 10/00; B33Y 40/20;
(Continued)

(56) References Cited

U.S. PATENT DOCUMENTS

2014/0163717 A1   6/2014   Das et al.
2015/0079306 A1   3/2015   Schoeneborn et al.
(Continued)

FOREIGN PATENT DOCUMENTS

CN       105624669 A       6/2016
DE    102013224788 A1      6/2015
(Continued)

OTHER PUBLICATIONS

Huang Sheng et al: "Title Laser re-scanning strategy in selective laser melting for part quality enhancement : a review", Proceedings of the 3rd International Conference on Progress in Additive Manufacturing (Pro-AM 2018), pp. 413-419, XP055540188, DOI: 10.25341/D4GP4J, Gefunden im Internet: URL:http://hdl.handle.net/10220/45859, [gefunden am Jan. 1, 2019 O]; the whole document; 2018.
(Continued)

*Primary Examiner* — Anessa T. Luk
(74) *Attorney, Agent, or Firm* — Wolter Van Dyke Davis, PLLC

(57) ABSTRACT

An irradiating method for the additive production of a component in order to heal structural defects in an additively constructed structure for the component. The method includes the providing of a laser or electron beam and the selective irradiating of a defect region of an additively constructed layer of the structure by the laser or electron beam according to a predetermined, in particular closed trajectory, which defines the defect region, wherein the defect region contains a structural defect. A method for
(Continued)

additive production, a correspondingly produced component and a computer program product utilize the method.

17 Claims, 8 Drawing Sheets

(51) Int. Cl.
| | |
|---|---|
| *B22F 10/36* | (2021.01) |
| *B22F 10/366* | (2021.01) |
| *B22F 10/38* | (2021.01) |
| *B22F 12/41* | (2021.01) |
| B22F 5/04 | (2006.01) |
| F01D 5/00 | (2006.01) |

(52) U.S. Cl.
CPC .............. *B33Y 10/00* (2014.12); *B22F 5/04* (2013.01); *B22F 10/36* (2021.01); *F01D 5/005* (2013.01); *F05D 2230/80* (2013.01)

(58) Field of Classification Search
CPC .......... B33Y 50/02; B22F 10/00; B22F 10/28; B22F 10/36; B22F 10/364; B22F 10/366; B22F 10/38; B22F 10/64
See application file for complete search history.

(56) References Cited

U.S. PATENT DOCUMENTS

2015/0224607 A1  8/2015  Bruck et al.
2021/0078076 A1* 3/2021  Jurg ........................ B22F 10/38

FOREIGN PATENT DOCUMENTS

| EP | 2601006 B1 | 6/2014 |
|---|---|---|
| JP | S63168272 A | 7/1988 |
| JP | H07241692 A | 9/1995 |

OTHER PUBLICATIONS

Hirsch M et al: "Targeted rework strategies for powder bed additive manufacture", Additive Manufacturing, vol. 19, pp. 127-133, XP055539971, NL, ISSN: 2214-8604, DOI: 10.1016/j.addma.2017.11.011; Section II, Figures 1, 2; 2017.
PCT International Search Report and Written Opinion of International Searching Authority mailed Oct. 11, 2019 corresponding to PCT International Application No. PCT/EP2019/070327 filed Jul. 29, 2019.

* cited by examiner

IRRADIATING METHOD FOR ADDITIVE PRODUCTION HAVING A PREDETERMINED TRAJECTORY

CROSS REFERENCE TO RELATED APPLICATIONS

This application is the US National Stage of International Application No. PCT/EP2019/070327 filed 29 Jul. 2019, and claims the benefit thereof. The International Application claims the benefit of European Application No. EP18187680 filed 7 Aug. 2018. All of the applications are incorporated by reference herein in their entirety.

FIELD OF INVENTION

The present invention relates to an irradiating method for the additive manufacturing of a component, in particular in order to heal structural defects of individual additively constructed layers for the structure of the component. Furthermore, a corresponding additive manufacturing method and a correspondingly manufactured component are specified. Furthermore, a computer program product is specified which is configured to carry out the selective irradiation.

The component is advantageously provided for use in a turbomachine, advantageously in the hot gas path of a gas turbine. The component advantageously consists of a superalloy, in particular a nickel- or cobalt-based superalloy. The alloy may furthermore be precipitation- or dispersion-hardened.

BACKGROUND OF INVENTION

Modern gas turbines are the subject of constant improvement in order to increase their efficiency. However, this results, inter alia, in ever higher temperatures in the hot gas path. The metallic materials for rotor blades, in particular of the first stages, are constantly being improved with regard to their mechanical and thermal strength. A further possibility for significantly improving the performance of parts subjected to hot gas loading is the use of new designs or cooling geometries or functionalities which allow the component to be cooled efficiently but reliably and thus allow a reduction of the material loading during operation.

Generative or additive manufacturing, on account of its disruptive potential for industry, is becoming increasingly of interest also for the redesign and series production of the abovementioned turbine components, such as, for example, turbine blades or burner components used in the hot gas path.

Additive manufacturing methods comprise as powder bed methods, for example, selective laser melting (SLM) or laser sintering (SLS), or electron beam melting (EBM).

A method for selective laser melting with a subsequent thermal treatment is known from EP 2 601 006 B1 for example.

Additive manufacturing methods have proved to be particularly advantageous in particular for complex components or components of complicated or filigree design, for example labyrinthine structures, cooling structures and/or lightweight structures. In particular, additive manufacturing is advantageous by virtue of a particularly short chain of process steps, since a production or manufacturing step for a component can be effected almost exclusively on the basis of a corresponding CAD file and the choice of corresponding manufacturing parameters.

Despite large degrees of freedom in the design of the components to be produced, additive manufacturing is inferior to the structural quality of conventionally manufactured components, produced for example by investment casting. This is owing, in particular, to the difficult construction process in terms of welding engineering and correspondingly high temperature gradients involved, which cause high mechanical stresses in the component. In particular, the temperatures introduced into a, for example pulverulent, starting material by a laser or electron beam have to locally exceed the melting point of the starting material. Away from the melt pool, however, the component or the powder bed is at nothing like these temperatures, which makes the component especially susceptible to hot or solidification cracks.

Although it is possible in some instances to detect these cracks, stresses, voids or flaws or other structural defects, such as lack of fusion, grain boundaries or phase boundaries, in the production machines by way of process monitoring, there is the difficulty of repairing or healing the corresponding defects reliably and advantageously also process-efficiently.

Conventional process monitoring systems utilize for example optical cameras, thermal imaging cameras, CMOS sensors, photodiodes, pyrometers or combinations of a plurality of sensors or systems.

Certain defects, such as lack of fusion between two layers, for example, can actually be repaired or healed by renewed remelting. However, particularly in the case of susceptible materials, this additional exposure or irradiation can lead to renewed or secondary defects, for example at the edge of a corresponding melt pool.

SUMMARY OF INVENTION

It is therefore an object of the present invention to specify means which enable structural defects to be healed expediently and/or efficiently. Means for an adapted irradiation or scanning strategy and process management are specified, in particular, which reduce the temperature gradients for example between a zone melted anew and solid material. For this purpose, repair strategies or algorithms are specified which are stored for example in control software of an additive manufacturing machine or installation and can be employed before the coating of the next layer.

This object is achieved by means of the subject matter of the independent patent claims. The dependent patent claims relate to advantageous configurations.

One aspect of the present invention relates to an irradiating method for the additive, in particular powder-bed-based, manufacturing of a component in order to "heal" or repair structural defects or construction defects in a, for example previously, additively constructed structure or layer for the component. The component relates in particular to metallic and advantageously high-performance components employed in the hot gas path of a gas turbine.

The method furthermore comprises providing a laser and/or electron beam, for example in the course of operation of a commercially available additive manufacturing installation for selective laser melting, selective laser sintering or electron beam melting.

The method furthermore comprises selective, targeted, predetermined, controlled and/or simulating irradiating of a defect region of an additively constructed layer of the structure with the laser and/or electron beam in accordance with a predetermined, in particular closed, trajectory, which defines the defect region. The defect region furthermore contains a structural defect, advantageously a structural defect detected in a previously constructed layer. Accordingly, the defect region can relate to a region viewed in a plan view of the layer.

The term "trajectory" advantageously denotes a path curve for the irradiation of a starting material or powder for the structure or the component. The trajectory, for example by virtue of its (lateral) extent in the corresponding layer, advantageously defines an outer dimension of the defect region.

In one configuration, the trajectory is a looplike trajectory.

The term "looplike" advantageously means that the trajectory is closed on itself, completely or in sections, and can comprise for example a plurality of arcs (see below).

The inventive irradiation trajectory or strategy and corresponding process management during the additive manufacturing or between the construction of individual layers advantageously reduce mechanical stresses and/or temperature gradients between (re)melted zones and already solidified material of the structure. Simplified and reliable process management or control is made possible at the same time.

Advantageously, precisely the predetermined and advantageously closed or looplike irradiation of the defect region, that is to say of a region containing the defect in the layer, enables particularly expedient thermal curing or repairing of a structural defect that has already occurred previously in the context of an additive manufacturing method. In particular, an energy input into the defect region can be controlled particularly accurately by means of repeated and/or adapted scanning or traversing of the trajectory with the laser or electron beam. Furthermore, the predetermined, advantageously closed, trajectory prevents the formation of new defect centers which could give rise to secondary defects, for example. The energy input introduced into a powder or base material over time, for example, can be tailored depending on the type of loop, for example the size and the diameter of corresponding arcs of the trajectory.

In one configuration, the defect region is chosen in such a way that the structural defect lies at a center point of the defect region. The center point can denote a center of mass or area or a geometric or area centroid of the defect region in the layer. This configuration simplifies in particular an increased energy input as a result of the irradiation or trajectory in the center of the defect region. In other words, the irradiation in accordance with this configuration can be effected more simply and more expediently.

In one configuration, the defect region comprises a plurality of partial loops or loop segments, wherein each partial loop has in particular two or more opposite arcs or is formed by the latter. In the case of two opposite arcs of a partial loop, this partial loop has an appearance similar to an "eight", for example.

In one configuration, individual partial loops or arcs are irradiated successively in the peripheral direction of the defect region. The peripheral direction advantageously relates to a plan view of the defect region in the layer and can be defined either according to the clockwise direction or in the counterclockwise direction. This configuration enables in particular a progressive or segmentlike irradiation of the defect region in a controlled and uniform manner, which in particular can expediently prevent the occurrence of secondary defects.

In one configuration, adjacent partial loops or arcs at least partly overlap. This configuration can be advantageous if, at the points of intersection of the partial loops or arcs, an energy input that is particularly increased locally or at points is desired or required for healing a defective defect. This requirement may be based for example on a simulation or a theoretical prognosis.

In one configuration, adjacent partial loops or arcs do not overlap or do not overlap in sections. This configuration can be advantageous if, at the points of intersection of the partial loops or arcs, in an area-covering manner or in a partial-loop-covering manner, either a particularly high or a particularly low energy input or a particularly high or low degree of remelting is desired or required for healing a detected defect.

A particularly high energy input or degree of remelting is effected in particular if the course of an arc runs parallel and particularly close to an adjacent arc. By contrast, a lower energy input or degree of remelting is effected if the course of an arc is distant for example from that of an adjacent arc. This configuration, too, can be advantageous for the complicated process of healing defects in additively constructed structures.

In one configuration, the partial loops or arcs are drop-shaped, conical or elliptic. These are all advantageous and/or expedient examples of "defect repair" which at the same time enables a simple embodiment in terms of control and regulation.

In one configuration, every or almost every arc proceeds from a center point of the defect region and—in order to form or define the partial loop or a further arc—runs through said center point again at the end. This configuration can expediently enable, particularly simply, a closed loop for the trajectory and/or an increased degree of melting or remelting at the center point of the defect region.

In one configuration, the defect region, advantageously comprising a plurality of partial loops or arcs (see above), is radially symmetrical. This configuration is particularly advantageous in the case of point defects, for example short cracks or local lack of fusion of a previously constructed layer of the structure.

In the present case, the expression "radially symmetrical" advantageously denotes, as viewed in a plan view of a layer, an invariance vis à vis rotations, that is to say angles and axes through the center point.

In one configuration, the defect region, advantageously comprising a plurality of partial loops and/or arcs (see above), is not radially symmetrical but rather (radially) asymmetrical, for example. This configuration can be advantageous in particular in the case of defects detected previously at the edge of the layer or structure or defects having a wide extent laterally, for example relatively long cracks or lack of fusion.

In one configuration, a beam parameter, for example a beam power, such as a laser power and/or power density, or irradiation speed, is varied during the irradiation of the defect region. This configuration affords a further degree of freedom enabling the healing to be prepared or configured, for example depending on the particular type of defect detected.

In the present case, the expression "beam parameter" advantageously means operation of the laser or electron beam independently of the chosen geometry or trajectory.

In one configuration, a beam power per partial loop or arc is increased in a core region of the defect region in comparison with an edge of the defect region. This configuration makes it possible, independently of geometry or trajectory, in particular, to form an increased energy input in the vicinity of the center point of the defect region and advantageously accordingly in the center of the defect. By way of example, the energy input in the edge region can expediently be chosen to be lower in order not to cause any secondary cracks in the defect region or in the vicinity of the original defect. At the same time, however, a heat input into the edge of the defect region is necessary in order to reliably repair the original defect.

In one configuration, beam parameters for the irradiation are chosen in such a way that a base material for the component is melted or remelted exclusively in the core region.

In one configuration, beam parameters for the irradiation are chosen in such a way that a base material for the component is only heated exclusively at the edge, that is to say is not melted or remelted.

In accordance with the two configurations just described previously, it is possible—as indicated above—to set the energy input particularly expediently and/or incrementally.

A further aspect of the present invention relates to a method for the additive, in particular powder-bed-based, manufacturing of a component, wherein in order to heal structural defects individual layers of the component are irradiated in accordance with the irradiating method described.

A further aspect of the present invention relates to a component, manufactured or manufacturable in accordance with the additive manufacturing method mentioned, wherein the component furthermore has a significantly reduced density of structural defects, in particular in comparison with an additively manufactured component from the prior art.

A further aspect of the present invention relates to a computer program or a computer program product comprising instructions which, when the program is executed by a computer, cause the latter to carry out the selective irradiation as described above, optionally with beam or irradiation parameters being defined and/or input by a user.

In accordance with the present nomenclature, the computer program product can thus likewise itself comprise the instructions mentioned. Alternatively or additionally, the computer program product, for example as a data structure, can directly designate or represent the predetermined trajectory of the selective irradiating method.

Configurations, features and/or advantages that relate in the present case to the irradiating method or the computer program or computer program product can furthermore relate directly to the method for additive manufacturing or the component, or vice versa.

Further features, properties and advantages of the present invention are explained in greater detail below on the basis of exemplary embodiments with reference to the accompanying figures. All features described above and below are advantageous here both individually and in combination with one another. It goes without saying that other embodiments can be used and structural or logical changes can be made, without departing from the scope of protection of the present invention. Therefore, the following description should not be interpreted in a restrictive sense.

The expression "or" and "and/or" used here, if used in a series of two or more elements, means that each of the elements presented can be used by itself, or any combination of two or more of the elements presented can be used.

BRIEF DESCRIPTION OF THE DRAWINGS

Further details of the invention are described below with reference to the figures.

DETAILED DESCRIPTION OF INVENTION

In the exemplary embodiments and figures, identical or identically acting elements can be provided with the same reference signs in each case. The illustrated elements and their size relationships among one another should not be regarded as true to scale, in principle; rather, individual elements may be illustrated with exaggerated thickness or size dimensions in order to enable better illustration and/or in order to afford a better understanding.

Figure 1:
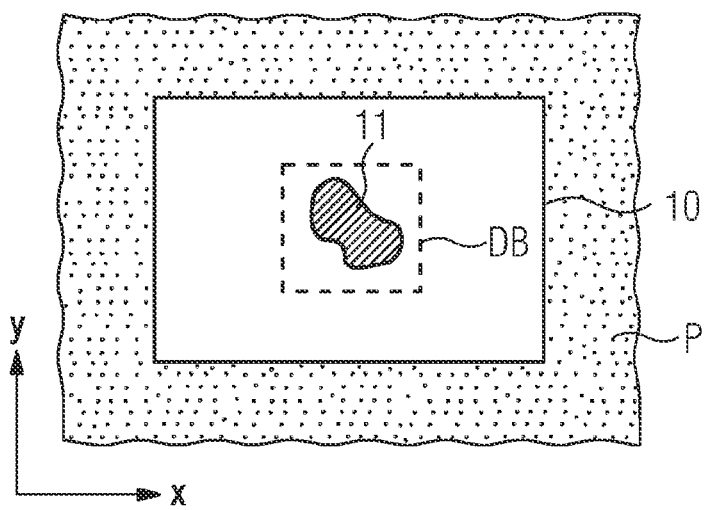
FIG. 1 shows a schematic plan view of an additively constructed structure.

FIG. 1 shows a schematic plan view of an additively constructed structure 10 for a component. In the present case, component and structure are provided with identical reference signs for the sake of simplicity, although there may also be structural differences, in particular, which are caused for example by a subsequent mechanical and/or thermal treatment.

The spatial directions according to which the structure, for example one or more additively constructed layer(s), extends (in lateral fashion) are identified by the directions x and y in the present case.

The component 10 is advantageously a component used in the hot gas path of a turbomachine, for example of a gas turbine. In particular, the component can denote a rotor blade or guide vane, a segment or ring segment, a burner part or a burner tip, a frame, a shield, a heat shield, a nozzle, a seal, a filter, an orifice or a lance, a resonator, a plunger or a vortex system, or a corresponding transition, insert, or a corresponding retrofitted part.

The component is constructed additively and advantageously from a powder or powder bed P, advantageously by means of selective laser sintering, selective laser melting or electron beam melting. Particularly advantageously, the component is constructed or produced by means of selective laser melting. In the context of the method, a structural defect in individual layers of the structure can be identified or detected customarily by means of conventional process monitoring, for example by way of CMOS sensors, photodiodes, pyrometers or combinations of these or similar methods. Such a structural defect is identified by the reference sign 11 in FIG. 1.

Furthermore, a defect region DB is depicted in FIG. 1. In accordance with the method described the defect region DB is chosen in such a way that it contains the structural defect 11. Accordingly, the defect region DB is advantageously a plan view region of the corresponding layer of the structure 10. The defect region DB furthermore denotes a region which should be subjected to thermal treatment, melted or remelted anew for an expedient repair or healing of the defect 11.

Figure 2:
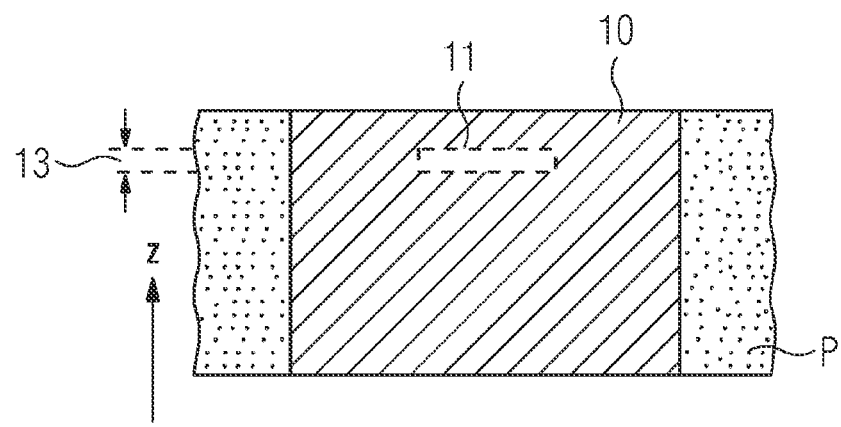
FIGS. 2-4 each show a schematic sectional view of an additively constructed structure.
Figure 3:
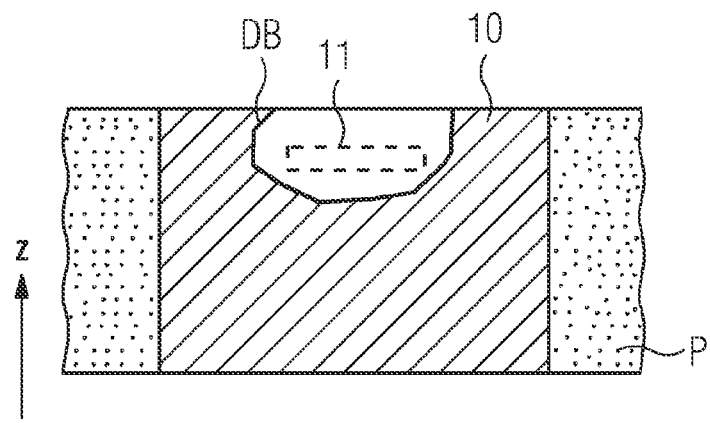
Figure 4:
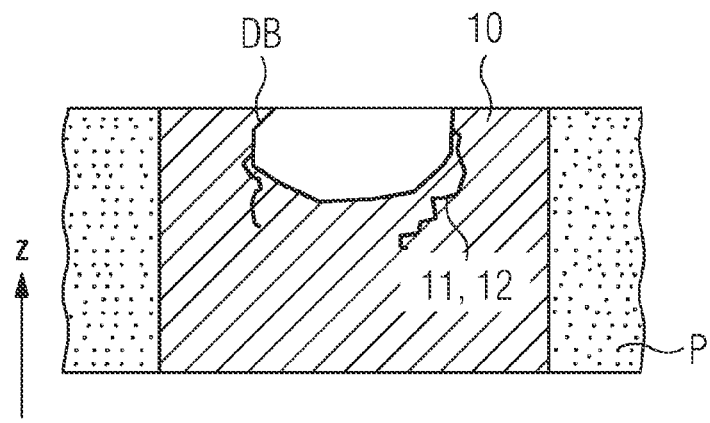

FIGS. 2 to 4 each show a schematic sectional view of the structure 10 while the latter is being additively constructed, for example. The structure 10 is illustrated with a rectangular shape merely by way of example. Arranged around the structure 10 is a powder bed, comprising a pulverulent base material or powder P, such as is inherent to powder-bed-based methods.

A construction direction of the component 10 is identified by the vertical z-direction in FIGS. 2 to 4.

The structural defect 11 is depicted with the aid of a dashed contour in the upper part of the structure 10. It can be discerned that the structural defect 11 extends over one layer thickness (cf. reference sign 13), for example. However, the structural defect 11 can equally well extend over less than the measure of one layer thickness or over the measure of a plurality of layer thicknesses.

In a layer to be constructed over the defect 11 or before a further layer of base material P is applied and solidified, the defect should be healed, however, in order to ensure a sufficient structural quality of the component 10. FIG. 2 reveals that the structure 10 is furthermore selectively irradiated by means of a laser or electron beam 20 and solidified.

FIG. 3 furthermore shows a defect region DB, in which "defect healing" is to be carried out analogously to FIG. 1, for example.

FIG. 4 shows the result of a defective or inadequate repair or healing of the defect, in which the defect region, for example by means of the laser or energy beam 20 or a further energy beam, was irradiated and "repaired" for example. Instead of a sufficient structural quality for the component 10 then having been ensured, consequential defects or secondary defects, such as the cracks 12 depicted resulted from the renewed remelting in the defect region on account of an incorrect irradiation strategy or choice of irradiation and/or beam parameters.

Figure 5:
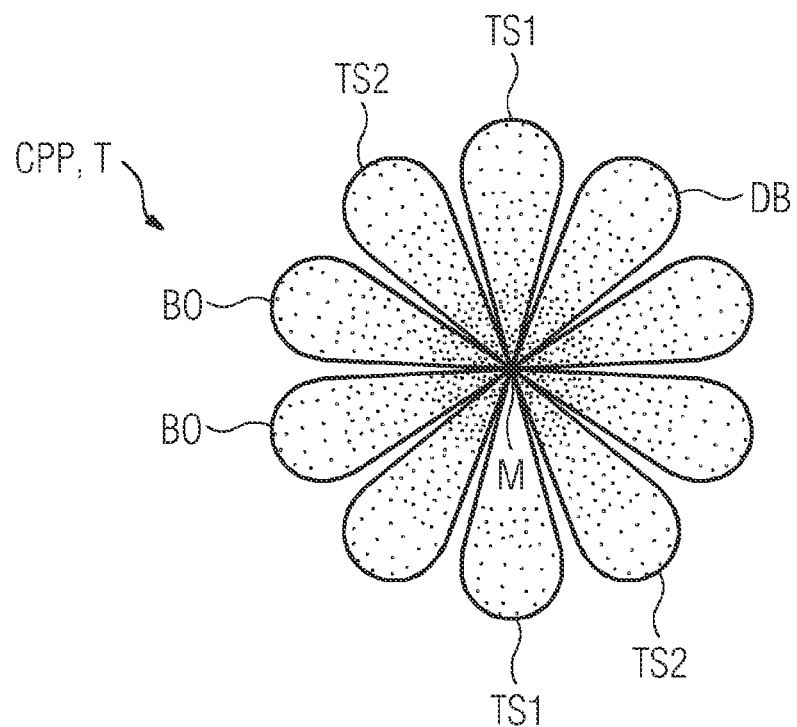
FIG. 5 indicates schematically in a plan view an irradiation trajectory according to the invention for the additive manufacturing of a component.

FIG. 5 then indicates, on the basis of a schematic plan view, in particular of a production area or material layer, an irradiation geometry or irradiation trajectory T according to the invention, according to which a part of the layer is advantageously irradiated selectively. The trajectory T is configured or chosen in a tailored manner, in a predefined manner, advantageously in a manner closed on itself and for example in a looplike, flower-shaped or bloom-shaped fashion, wherein the contours of the blooms or petals represent the actual irradiation path. Preferably the trajectory defines the defect region DB or delimits the latter, such that the defect region has for example the same extent as an "envelope" of the trajectory or bloom shown.

It can furthermore be discerned that the trajectory T has partial loops TS1, TS2 and arcs BO. Preferably, a partial loop can have two or more opposite arcs BU. In the case of exactly two opposite arcs BO of a partial loop TS1, TS2, this partial loop—as illustrated in FIG. 5—has an appearance similar to an "eight" or a longitudinally sliced $2p$ atomic orbital, for example.

Individual arcs BO of the trajectory T are advantageously shaped as drops or conically and attached to one another as a result such that they occupy individual circle segments of the trajectory.

In this configuration, the arcs BO and/or the partial loops TS1, TS2 are furthermore shaped for example in an identical way and with an identical size.

By way of the described irradiation method in order to heal structural defects 11, advantageously—within a partial loop TS1, TS2—firstly one arc and then an exactly opposite arc within the trajectory T is scanned or traversed (also cf. FIG. 7 further below).

Furthermore, advantageously, firstly one partial loop TS1 and subsequently or progressively in the peripheral direction, i.e. in the clockwise direction or, as illustrated in FIG. 5, in the counterclockwise direction, a second partial loop TS2 is irradiated.

The trajectory T furthermore has a center point, which defines a center of the defect region DB in the illustration in FIG. 5.

The trajectory T in accordance with FIG. 5 is furthermore embodied or shaped radially symmetrically.

Figure 9:
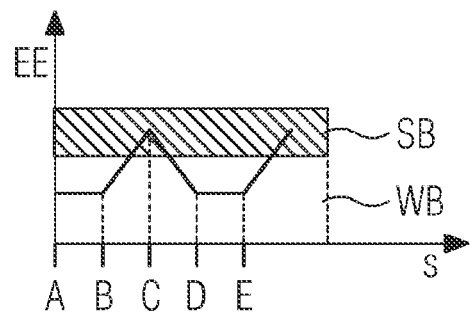
FIG. 9 shows a diagram indicating schematically the spatial profile of an energy input in accordance with the irradiation from FIG. 8.
Figure 10:
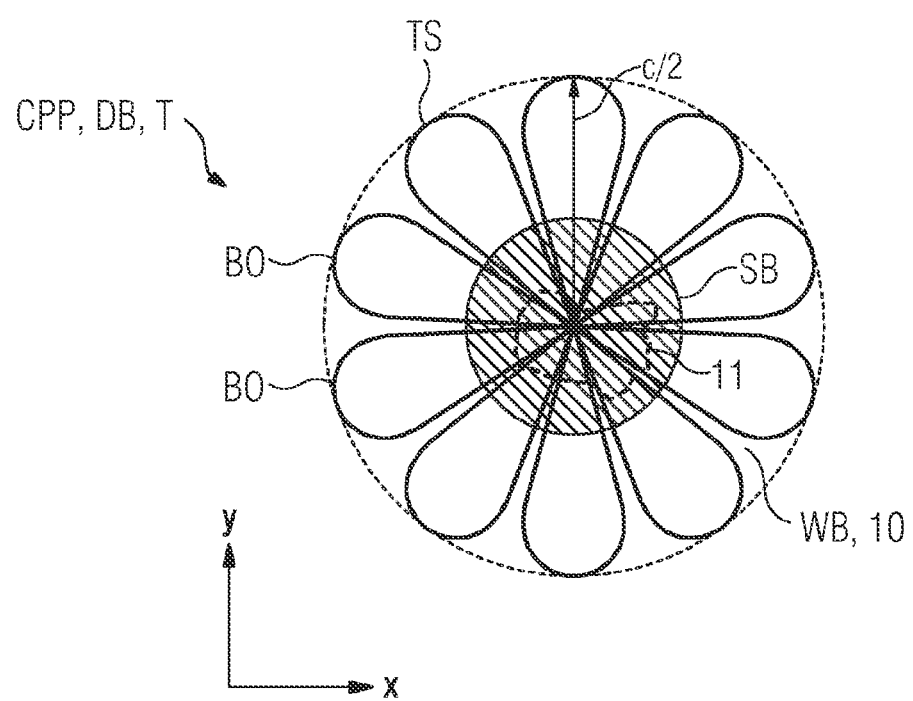
FIG. 10 indicates schematically in a plan view an irradiation trajectory according to the invention in accordance with a further configuration.

If the defect region DB of an additively constructed (physical) layer 13, which defect region is chosen as described and contains the structural defect 11, is irradiated progressively by means of the laser and/or electron beam, i.e. in opposite loops and along a periphery of the defect region DB, a corresponding energy input EE (cf. for example FIG. 9 further below), depending on the irradiation speed, has the effect that on average over time a core region or center point region (cf. reference sign SB in FIG. 10) of the defect region DB or of the trajectory T is exposed to more heat or energy than for example an edge or peripheral region of the trajectory T (cf. reference sign WB in FIG. 10). This situation, which is identified on the basis of the gradated filling of the defect region DB in FIG. 5, is technically advantageous since an incremental variation of the energy introduced into the structure 10 is also made possible on the basis of a closed loop. Firstly, this advantageously has the effect that the risk of generating secondary defects or cracks is low. Secondly, according to the geometry of the predetermined and advantageously closed trajectory T, the energy input can be tailored, for example according to the detected defect (see below).

The irradiation trajectory or strategy according to the invention and corresponding process management during the additive manufacturing or between the construction of individual layers advantageously reduce mechanical stresses and/or else temperature gradients that arise between zones melted anew and already solidified material of the structure 10.

Figure 6:
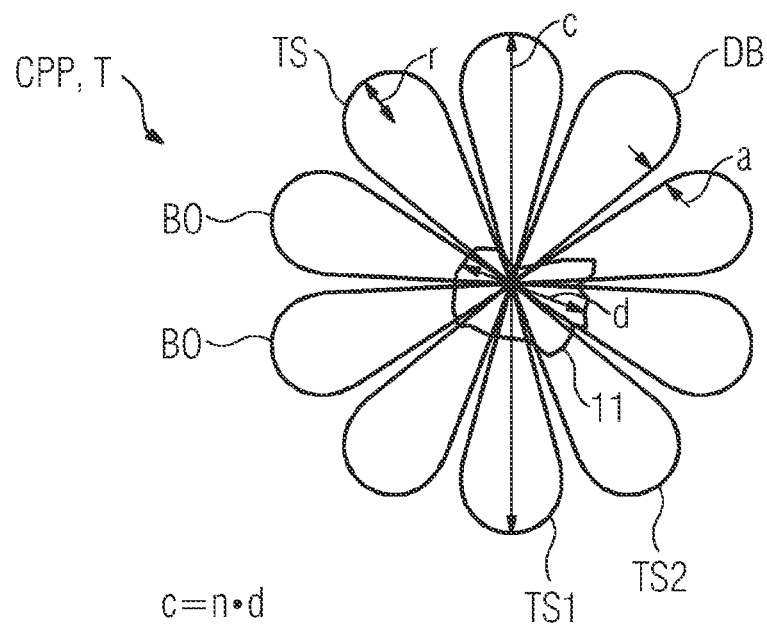
FIG. 6 indicates schematically an irradiation trajectory in accordance with FIG. 5 and also a structural defect.

FIG. 6 shows, in addition to FIG. 5, explicitly the structural defect 11. In the schematic illustration shown in FIG. 6, the structural defect 11 is identified as being arranged in or encompassing the center point M of the defect region. This embodiment advantageously allows, as described above, a simple implementation or control o the irradiation and at the same time the gradation of the energy input. Even though the structural defect 11, for example a crack, a lack of fusion, a vacancy, a "stacking fault" or for example any other structural deviation for example from an ideal and/or expected crystalline order of the structure 10, is not exactly radially symmetrical in the real case (as also illustrated) a radially symmetrical trajectory T can be expedient and advantageous, particularly if a dimension of the defect region c is larger than, for example double the magnitude of, a dimension d of the defect 11.

FIG. 6 furthermore identifies that an arc radius of individual arcs or partial loops is designated by r, a diameter or a dimension of the defect region or of a partial loop is designated by c, a maximum distance between adjacent partial loops or arcs is designated by a, and a maximum dimension or a diameter of the defect 11 is designated by d.

Accordingly, c advantageously corresponds to a natural multiple (corresponds to a natural number greater than 1) of d. By way of example, n can be equal to 2, 3 or 4.

The distance a between adjacent partial loops or bloom elements can assume both positive and negative values—for example depending on the type of defect 11 detected and the individually chosen trajectory T. In the case of a negative distance a, individual arcs BO or partial loops TS can overlap. Alternatively or additionally, the number of elements, partial loops TS or arcs BO can be defined in such a way as to result in a specific distance a. The radius r can furthermore be chosen by a user of the method or engineer of a corresponding additive manufacturing installation, for example via a user interface (not explicitly identified).

Figure 7:
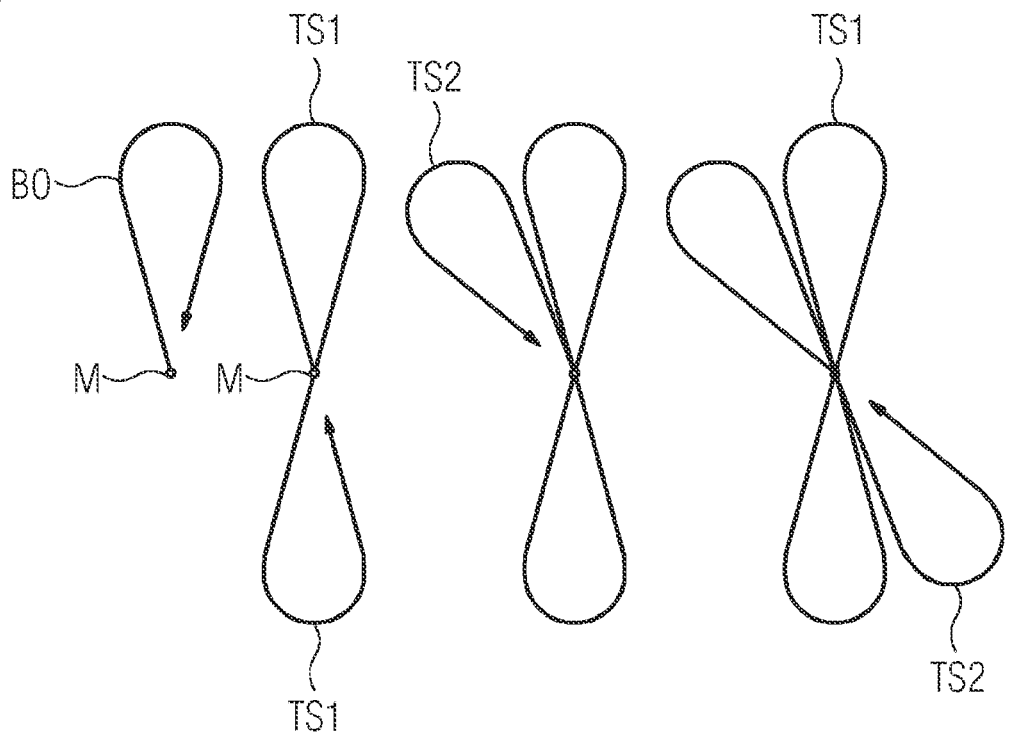
FIG. 7 indicates schematically a progressive irradiation of an additively constructed structure.

FIG. 7 indicates clearly from left to right the progressive progress of an exemplary irradiation trajectory T (cf. likewise FIG. 5). On the left the drawing identifies the irradiation of a layer (cf. reference sign 13) in accordance with a single conical arc BO proceeding from the center point M of the corresponding defect region DB. The next situation (further to the right) shows that the first (upper) arc BO is furthermore led back through the center point M and carries on running and an opposite second arc of a first partial loop TS1 is subsequently formed so as to thereupon run through the center point M again.

Afterward, a second partial loop TS2 begins according to the course of the trajectory T and progressively in the counterclockwise direction. Said partial loop TS2 is completed analogously to the partial loop TS1 in that part of the drawing which is on the far right in FIG. 7.

In accordance with this configuration and in accordance with the other configurations shown, the energy input (cf. furthermore FIG. 8) can be varied for example by a beam power being increased in the center of the defect region DB or near the center point (cf. reference sign SB in FIG. 10) and being reduced at the edge (cf. reference sign WB in FIG. 10). Alternatively or additionally, the irradiation speed can for example be increased in the edge region and reduced in the center, in order to adapt the energy input with the laser power being constant.

Figure 8:
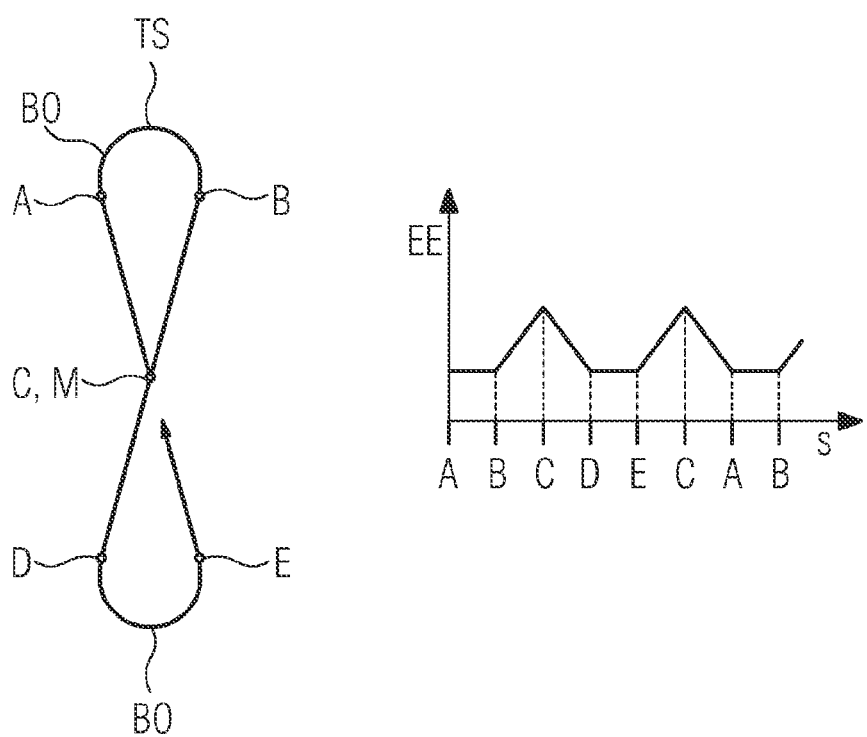
FIG. 8 indicates schematically details of an irradiation of an additively constructed structure.

FIG. 8 indicates by way of example and schematically further aspects of the irradiation or repair method according to the invention for structural defects on the basis of a single partial loop TS, comprising two opposite arcs BO. This partial loop TS is progressively subdivided into the geometric sections A, B, C, D and E before this partial loop is irradiated to completion. In the right-hand part of the illustration, analogously thereto, a possible introduced energy input is plotted qualitatively versus the path distance s covered. This reveals that the energy input EE experienced by the layer is the greatest at the center point M or C. By contrast, the energy input EE is the least in the regions A-B, and D-E, which denote the edge regions of the trajectory. This configuration affords the advantages described above. Furthermore, it can be discerned that the energy input EE in the regions B-C and E-C and C-D and C-A (as described above) proceeds incrementally, specifically in an increasing and a decreasing manner respectively.

FIG. 9 indicates further advantageous configurations of the method described, in particular the possibility of adapting the introduced energy such that the material P for the component 10 is actually remelted only in the region of the detected defect (center point region or core of the defect region DB). Further outward, or in an edge region, the material is advantageously only heated, which can likewise lead to a healing of defects and moreover even to a formation of phase precipitations. Preferably, however, the material is not melted or remelted in this region; in other words, the melting point is not exceeded locally. This is identified with the aid of the schematic diagram in FIG. 9. In the region of the energy peaks around the point C or the center point, therefore, as a result of the irradiation by means of the energy beam 20, a melt pool is formed selectively (cf. hatched region in the diagram), whereas only a heated region WB arises in the edge regions, for example.

FIG. 10 furthermore elucidates this relationship in a schematic plan view of the defect region DB. The hatched core region of the region DB, which advantageously completely contains the defect 11, advantageously defines the region of a melt pool SB. If the defect 11 is thus accordingly completely remelted, for example, the defect 11 can also expediently be healed and further defect formation can be prevented, for example.

The region of the melt pool SB advantageously denotes a radially inner part of the defect region DB, whereas the heated region WB defines a radially outer region adjoining the region of the melt pool SB. The radius (not explicitly depicted) of the region of the melt pool SB can be for example one to two thirds of a radius (cf. c/2) of the defect region DB.

Figure 11:
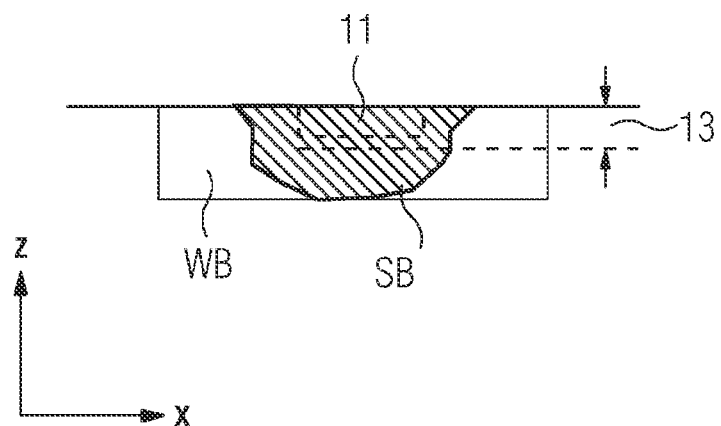
FIG. 11 indicates schematically in a sectional view aspects of the irradiation in accordance with the irradiation trajectory from FIG. 10.

FIG. 11 indicates in a schematic sectional view aspects of the irradiation in accordance with the irradiation trajectories from FIG. 10. This reveals the profile of the melt pool SB, which, in the sectional view, likewise contains the structural defect 11 or advantageously encloses the latter. A layer or layer thickness 13 is depicted, moreover, which in the z-direction (construction direction), for example, has an extent greater than that of the defect 11, but less than that of the melt pool SB. As a result of this configuration, the melt pool SB can advantageously also completely reach the defect 11 and expediently heal it.

Figure 12:
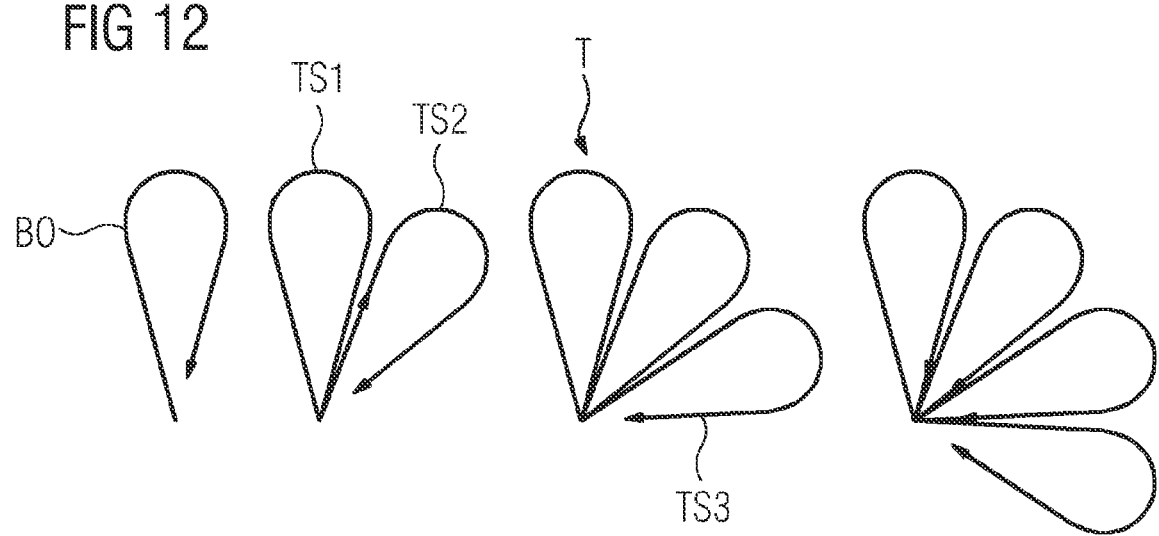
FIGS. 12-16 indicate schematically further aspects of the irradiating method according to the invention.

FIG. 12 shows from right to left the progressive progress of an alternative irradiation trajectory T to the configuration in FIG. 7. On the left in the drawing, an arc BO is scanned in a similar manner to the illustration in FIG. 7. Further toward the right the illustration shows that following the arc BO, which is provided for a first partial loop TS1 and constitutes the latter, a second arc for or constituting a second partial loop TS2 is irradiated. After that in the clockwise direction, further toward the right the drawing identifies that a further arc for or constituting a third partial loop TS3 is irradiated; on the far right, once again a further arc (not explicitly identified) of a further partial loop or of a further arc.

An increased heat input (overheating) often occurs automatically at the turning point of the arcs, loops or the trajectory by virtue of the fact that a beam guiding optical unit, for example comprising deflection mirrors, of the corresponding manufacturing installation inherently operates with a certain inertia. This affords the possibility of irradiating, i.e. traversing the trajectory, with constant irradiation or beam power, for example target laser power, and a constant target irradiation speed, wherein the inventive advantages can likewise be utilized without varying the beam parameters mentioned, for example increasing the irradiation power.

In this way, too, the underlying problem is thus solved and in comparison with the embodiments described above at the center an increased energy input and thus increased degree of remelting (temporally or spatially) is achieved. In other words, the possibility is afforded of varying an energy input by way of the choice of the corresponding trajectory, partial loops or arcs alone. Alternatively or additionally, the energy input, in particular in order to avoid destructive temperature gradients during the layer-by-layer construction of the structure 10, can additionally also be effected by way of beam parameters.

Figure 13:
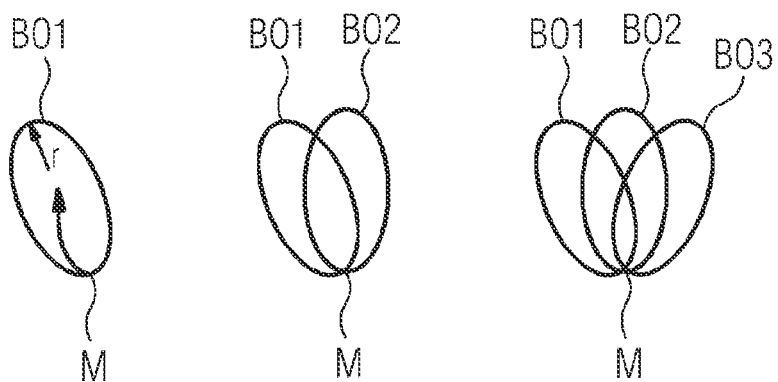

FIG. 13 shows, in contrast to the previous configurations of the trajectory T, an elliptical shape of the partial loops or arcs BO1, BO2, and BO3. Furthermore, the individual arcs overlap and intersect at a point of intersection (not explicitly identified) and possibly at the center point of the defect region DB.

In the case of the elliptical partial loops, elements or arcs, besides the total diameter (cf. c/2 above), a radius r, the overlap or distance a and also a width (not explicitly identified) of the arcs can be edited or transferred to a controller (cf. reference sign CPP further below) by a user via a user interface, for example.

Although not explicitly illustrated in the figures, it is possible to irradiate individual partial loops in accordance with this configuration also with opposite arcs, for example analogously to the embodiment described in FIG. 7.

Figure 14:
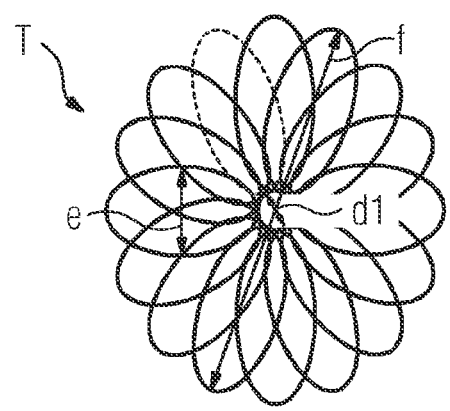

The trajectory T can be embodied overall for example also as illustrated in FIG. 14, wherein the depicted distances e and f and also dl constitute further parameters or characteristics variables for the selected irradiation trajectory. A user of the described method or of the corresponding additive manufacturing installation can use these parameters for example to define which values are intended to be kept constant. For example the radius r and the distance a of the elements could remain constant, while the distance with respect to the center decreases.

Figure 15:
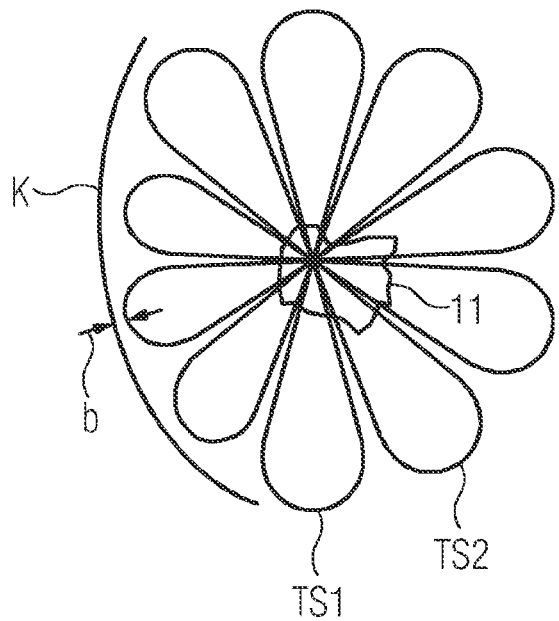

FIG. 15 shows a situation where a corresponding layer at a structure edge or component edge K is irradiated for the purpose of defect healing. At said edge K, the trajectory T or irradiation geometry is advantageously distorted or deviates from a radial symmetry as illustrated in FIG. 15. The depicted distance with respect to the component edge b can be defined, for example, and should advantageously be greater than zero and less than 1 mm, for example be between 1 and 0.5 mm, in particular 0.2 mm.

In accordance with this configuration, the beam power or laser power can also be automatically adapted by a computer or by the user (via a user interface with the computer), for example, such that the remelted region is no longer symmetrical. However, it is then necessary to cover the entire defect with a defined or predetermined distance, wherein sufficient energy for remelting has to be provided. In other words, the defect region still has to be dimensioned correspondingly.

Figure 16:
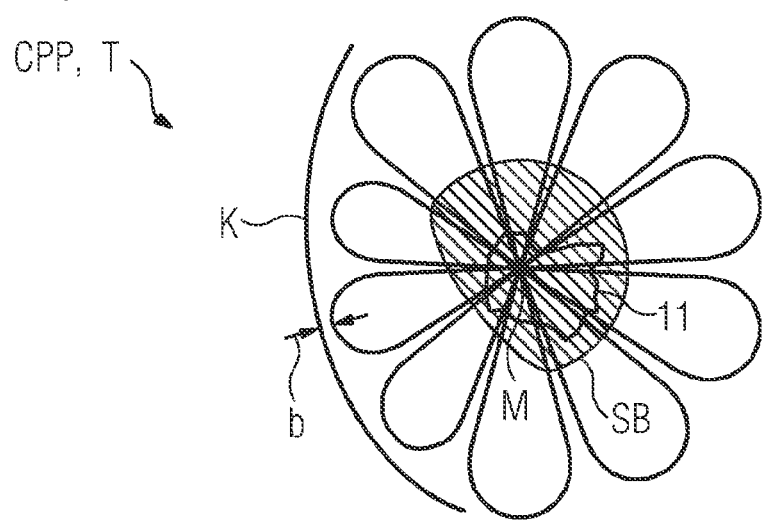

Such a situation is illustrated in FIG. 16, which shows a melt pool SB (cf. hatching) enclosing the entire defect 11 within the defect region DB. Provision can likewise be made for irradiating a structural defect at a component corner (not explicitly identified) in accordance with the method described, wherein the trajectory T can be correspondingly distorted at a plurality of sides.

Furthermore, in the context of the present invention, a computer program product or a computer program is specified which for example can comprise or can be implemented in control software for the preparatory processes for additive manufacturing, for example CAM methods. Accordingly, the trajectories T presented are likewise indicated with the reference sign CPP for computer program product, since the actual irradiation is only made possible by the computer program or computer program product as a result of the computer program. Possibly, taking account of all necessary geometric parameters, irradiation parameters, and also beam parameters in a manual manner is not possible, such that the invention described can alternatively or advantageously be defined by the computer program product CPP.

The invention is not restricted to the exemplary embodiments by the description on the basis thereof, but rather encompasses any novel feature and also any combination of features. This includes in particular any combination of features in the patent claims, even if this feature or this combination itself is not explicitly specified in the patent claims or exemplary embodiments.

The invention claimed is:

1. An irradiating method for the powder-bed-based, additive manufacturing of a component in order to heal structural defects in an additively constructed structure for the component, comprising:
   providing a laser or electron beam,
   selectively irradiating a defect region of an additively structured layer of the structure with the laser or electron beam in accordance with a predetermined trajectory, which defines the defect region, wherein the trajectory is a looplike trajectory, wherein the defect region contains a structural defect,
   wherein the trajectory comprises a plurality of partial loops and each partial loop has arcs, and
   wherein the arcs are closed and are disposed at unique clocking positions about a center point of the defect region.

2. The method as claimed in claim 1,
   wherein the defect region is chosen in such a way that the structural defect lies at the center point of the defect region.

3. The method as claimed in claim 1,
   wherein individual partial loops or the arcs are irradiated successively in a peripheral direction of the defect region.

4. The method as claimed in claim 1,
   wherein adjacent partial loops or the arcs at least partly overlap.

5. The method as claimed in claim 1,
   wherein adjacent partial loops or the arcs do not overlap.

6. The method as claimed in claim 1,
   wherein the plurality of partial loops or the arcs are elliptic in shape.

7. The method as claimed in claim 1,
   wherein every arc proceeds from the center point of the defect region and—in order to form the partial loop or a further arc—runs through the center point again at the end.

8. The method as claimed in claim 1,
   wherein the trajectory is radially symmetrical.

9. The method as claimed in claim 1,
   wherein a beam parameter is varied during the irradiation of the defect region.

10. The method as claimed in claim 9,
    wherein the beam parameter comprises a beam power or irradiation speed.

11. The method as claimed in claim 1,
    wherein a beam power per partial loop or arc is increased in a core region in comparison with an edge of the defect region.

12. The method as claimed in claim 1,
    wherein beam parameters for the irradiation are chosen in such a way that a base material for the component is remelted exclusively in a core region and is only heated at an edge.

13. The method as claimed in claim 1,
    wherein the predetermined trajectory is closed.

14. The method as claimed in claim 1,
wherein each partial loop has two opposite arcs.

15. A method for the powder-bed-based, additive manufacturing of a component,
irradiating individual layers of the component in accordance with the method as claimed in claim 1, in order to heal structural defects.

16. An irradiating method for the powder-bed-based, additive manufacturing of a component in order to heal structural defects in an additively constructed structure for the component, comprising:
providing a laser or electron beam,
selectively irradiating a defect region of an additively structured layer of the structure with the laser or electron beam in accordance with a predetermined trajectory, which defines the defect region, wherein the trajectory is a looplike trajectory, and wherein the defect region contains a structural defect,
wherein the trajectory comprises a plurality of partial loops and each partial loop has arcs, and
wherein adjacent partial loops or the arcs at least partly overlap.

17. An irradiating method for the powder-bed-based, additive manufacturing of a component in order to heal structural defects in an additively constructed structure for the component, comprising:
providing a laser or electron beam,
selectively irradiating a defect region of an additively structured layer of the structure with the laser or electron beam in accordance with a predetermined trajectory, which defines the defect region, wherein the trajectory is a looplike trajectory, and wherein the defect region contains a structural defect,
wherein the trajectory comprises a plurality of partial loops and each partial loop has arcs, and
wherein a beam power per partial loop or arc is increased in a core region in comparison with an edge of the defect region.

\* \* \* \* \*